United States Patent [19]
Hauser

[11] Patent Number: 5,942,258
[45] Date of Patent: Aug. 24, 1999

[54] DELIVERY DEVICE FOR FREE-FLOWING MATERIALS CONSISTING OF AT LEAST TWO MUTUALLY REACTANT COMPONENTS, IN PARTICULAR CASTING RESINS

[75] Inventor: Erhard Hauser, Schoffengrund, Germany

[73] Assignee: Wilhelm Hedrich Vakuumanlagen GmbH & Co., KB, Ehringshausen-Katzenfurt, Germany

[21] Appl. No.: 08/894,413

[22] PCT Filed: Feb. 20, 1996

[86] PCT No.: PCT/EP96/00688

§ 371 Date: Oct. 10, 1997

§ 102(e) Date: Oct. 10, 1997

[87] PCT Pub. No.: WO96/26057

PCT Pub. Date: Aug. 29, 1996

[30] Foreign Application Priority Data

| Feb. 20, 1995 | [DE] | Germany | 195 05 778 |
| May 11, 1995 | [DE] | Germany | 195 16 860 |

[51] Int. Cl.[6] .................................................. B29C 45/82
[52] U.S. Cl. .......................... 425/145; 264/40.4; 264/40.7
[58] Field of Search .......................... 425/145; 264/40.4, 264/40.7; 222/135

[56] References Cited

U.S. PATENT DOCUMENTS

| 4,167,236 | 9/1979 | Taubenmann | 222/135 |
| 4,275,822 | 6/1981 | Juffa et al. | 222/135 |
| 4,307,760 | 12/1981 | Hauser | 425/145 |
| 4,565,511 | 1/1986 | Ramisch | 425/145 |
| 4,611,982 | 9/1986 | Haeuser et al. | 425/543 |
| 4,956,133 | 9/1990 | Payne | 425/145 |

FOREIGN PATENT DOCUMENTS

| 4208769 | 10/1992 | Austria . |
| 225604 | 6/1987 | European Pat. Off. . |
| 644025 | 7/1994 | European Pat. Off. . |
| 7702748 | 9/1978 | Netherlands . |

Primary Examiner—Tim Heitbrink
Attorney, Agent, or Firm—Liniak, Berenato, Longacre & White

[57] ABSTRACT

An apparatus for feeding fluid-flow substances composed of at least two mutually reacting components, in particular casting resin, the components being fed from piston-cylinder units (7, 8) associated with supply vessels (1, 2) and from there being conveyed to a mixing system (36). The piston-cylinder units (7, 8) are fitted with retraction capability for the conveyor pistons (17, 19). A drive system is provided to load the conveyor pistons (17, 19) with a pressurized fluid. The piston-cylinder units (17, 19) evince a displacement volume of which the lower limit is determined by the viscosity of the component to be conveyed and the stroke frequency of the conveyor pistons (17, 19) in relation to the required rate of conveyance. The displacement volume of the piston-cylinder units (7, 8) may be between 0.1 and 4 ltr, preferably being 1 ltr.

21 Claims, 8 Drawing Sheets

DELIVERY DEVICE FOR FREE-FLOWING MATERIALS CONSISTING OF AT LEAST TWO MUTUALLY REACTANT COMPONENTS, IN PARTICULAR CASTING RESINS

BACKGROUND OF THE INVENTION

1. Field of the Invention

The invention concerns an apparatus for delivering fluid materials consisting of at least two mutually reacting components, in particular casting resin, wherein the components are moved from piston-cylinder units associated with supply vessels to a mixing system. The piston-cylinder units are fitted with retraction means for the conveyor pistons, and a drive system to load the conveyor pistons with pressurized fluid is provided.

2. Description of Related Art

Apparatus for filling at least one casting mold with castable liquid media is known for instance from the German patent document 34 20 222 A1, wherein the components of the casting substance are fed by conveyor means to one mixing system, and from there, the casting substance moves to at least one casting mold. The conveyor means is a piston-cylinder system associated with a pullback cylinder to retract the conveyor piston of the piston-cylinder unit. The known metering system however is designed in such manner that the volume of the piston-cylinder unit is sufficient to fill only the particular casting mold associated with that system, thus, in the event of large casting molds, commensurately large piston-cylinder structures are required and hence correspondingly high costs are entailed. As a result the pressure-gelling apparatus is applicable only in a limited way and always must be matched to the particular requirements.

SUMMARY OF THE INVENTION

The object of the invention is to improve upon the apparatus of the prior art, such that it shall be applicable in standard model sizes and preferably shall offer good handling of the piston-cylinder units for the most diverse volumes of casting molds.

The apparatus of the invention is universally applicable for various castings' volumes. Depending on the volume of the casting, several strokes of the piston-cylinder units are carried out as a rule. The lower design limit for the displacement volume of the piston-cylinder unit is essentially set by the viscosity of the components to be conveyed and is determined by the stroke frequency of the conveyor piston relative to the required conveyance rate. As the viscosity increases, that is as the component becomes tougher in its liquid form, larger feed cross-sections to the piston-cylinder units are required in order to assure the filling of the product chambers of the piston-cylinder units within the time intervals determined by the stroke frequency. The feed cross-section becomes especially significant when only the static feed pressure of the supply vessel is acting on the component as the cylinder is being filled. The stroke frequency also affects the dimensioning of the displacement volume and is given by the quotient of conveyance rate and stroke volume. Contrasted with the essentially operationally dictated lower limit, the upper limit of the displacement of the piston-cylinder units will be determined in the invention both as a function of the required metering accuracy and the synchronous operation of the two piston-cylinder units as well as of system costs and handling. As the displacement or stroke volume of the piston-cylinder unit increases, the volume of the drive fluid must also increase commensurately. Thereby the elasticity of the total system, being the sum of the mechanical elasticity of drive-unit housing and piston-cylinder unit on one hand and the fluids' elasticity on the other hand, will also increase, and the metering accuracy is degraded. It must be borne in mind in this respect that the apparatus must be designed for conveyance pressures of 100 bars and more. Another criterion for the upper limit of the displacement volume are the costs of construction for the piston-cylinder units and of the total system. Another criterion is good handling of the individual components for instance for purposes of maintenance and repairs.

In a first advantageous embodiment of the invention, the displacement volume of the piston-cylinder units shall be between 0.1 and 4 ltrs, preferably about 1 ltr. It was found that such design limits will cover a wide range of applications for the most diverse casting volumes, with the ability to substantially observe the above criteria relating to viscosity, stroke frequency, costs, handling, conveyance rate.

To minimize the pressure differential of the sealing zones of the piston-cylinder units, the invention recommends that the conveyance-side and the drive-side effective piston surface of the conveyor pistons of the piston-cylinder units be essentially equally large, whereby a correspondingly small piston-rod diameter follows.

The invention furthermore provides a device to detect the conveyor-piston position. This can be implemented for instance by means of at least one incremental detector, a sensor, a limit switch or a similar detector associated to the drive system and/or the piston-cylinder unit(s).

The scope of the invention furthermore covers the integration of a shutoff member for the component intake and/or discharge as regards the conveyance chamber, preferably into the housing base of the particular piston-cylinder unit. In this manner it is possible to minimize the feed paths to the piston-cylinder unit or to the mixing system, and flow impedance is reduced thereby. This is especially advantageous when feeding the particular component from the supply vessel to the piston-cylinder unit.

The invention renders construction especially advantageous when the conveyor piston and the retraction piston of the retraction system are mutually spaced apart and both are held by one piston rod, a partition being mounted between the conveyor piston and the retraction piston to separate a drive chamber for the drive fluid facing the conveyor piston from a chamber facing the retraction piston and loaded by a fluid for the retraction of the conveyor piston. Such piston-cylinder designs with retraction system furthermore are easily handled in the form of standard units.

In the invention, each piston-cylinder unit may be associated with a drive-piston/cylinder unit of which the cylinder space is connected to the drive chamber of the particular piston-cylinder unit. In this design the volume ratios of components to be mixed may be freely preselected by controlling the drive unit, said control simultaneously also assuring synchronous motion of the piston-cylinder unit. Obviously a separate control also may be provided for the synchronized motion of the piston-cylinder units.

Alternatively the drive system for a drive-piston/cylinder unit may be equipped with a stepped piston of which the individual cylinder spaces each are associated to a drive chamber of one piston-cylinder unit. This design offers the advantage of low construction-cost for the drive system and for the position detection means of the conveyor piston(s), such means preferably being assigned to the drive-piston/ piston unit. In this design of the drive system, the metering ratio of the piston-cylinder units is determined by the steps of the drive piston and at the same time synchronization of the conveyor pistons of the piston-cylinder units is assured.

To this extent the invention recommends providing a balancing valve system between the cylinder spaces in order that the filling levels of the individual piston-cylinder units implementing the conveyance of the components can be scanned before conveyance starts and the quantities of fluid of the drive system to be loaded can be balanced.

Obviously the conveyor pistons also may be directly loaded with fluid from the drive unit. However in this regard care must be taken that the pressurized fluid is compatible with or matched to the particular component.

All apparatus of the invention share in common that the piston-cylinder units and the drive systems are separated assemblies and as a result it is possible to provide different groups of drives for identical basic piston-cylinder units. It follows that a modular system is made possible for the whole, wherein the particular drive groups can be selected in response to requirements.

The scope of the invention further covers the feature that the drive system is designed to maintain, by means of the drive fluid through the conveyor pistons of the piston-cylinder units, an appropriate follow-up pressure during the gelling phase on the casting mold(s) and therefore no further equipment is needed to generate a follow-up pressure.

In a further concept of the invention, the conveyor piston of one piston-cylinder unit may be designed as a plunger where the separation between the product chamber and the drive chamber is preferably implemented by a seal affixed in the cylinder space.

In some circumstances it may be preferable within the scope of the invention that a charging pump or a similar pumping system be provided to feed the particular component from the supply vessel to the piston-cylinder unit. Such enhancement of the conveyance of the component can be implemented illustratively by a corresponding configuration within the supply vessel itself, for instance using a conveyor worm or the like mounted in the supply vessel.

It is further within the scope of the invention that the apparatus is designed to fill at least two casting molds with casting resin, each mixing system being connected by blockable feed lines to the piston-cylinder units. As a result several casting molds can be filled in time-staggered manner.

In one embodiment of the invention at least one buffer is associated to the casting molds in order to maintain a follow-up pressure during the gelling phase. Such a buffer is of the kind described for instance in the German patent document 27 48 982 C2.

In especially advantageous manner the buffer precedes the particular mixing system, comprising in each case one buffer element for one component. Thereby it is possible to feed the components separately from each other at the desired recipe ratio, by means of the buffer elements, to the associated mixing system.

The invention also provides that the buffer is designed as a piston-cylinder unit having a stepped piston for the at least two components, whereby an especially compact and simple construction is obtained.

Lastly, in another special embodiment of the invention, the piston-cylinder units possibly having a drive system are implemented at least dually relative to the mixing system, the two units conveying the particular components of the mixing system in counter-strokes. Because of the counter-stroke operation of the piston-cylinder units, the components are continuously fed to the mixing system, whereby it is possible to cast the casting mold without interruption also in several strokes. It does not necessarily follow that doubling the units entails requiring also two drive units for the drive system. Illustratively a single drive unit may suffice, for instance a hydraulic system to load the drive units which in turn act on the conveyor pistons of the piston-cylinder units.

Further goals, advantages, features and applications of the present invention are elucidated in the following description of illustrative embodiments and in relation to the drawing. All described and/or pictorially shown features constitute the object of the present invention, independently of their summarization in the claims.

DETAILED DESCRIPTION OF THE PREFERRED EMBODIMENTS

Figure 1:
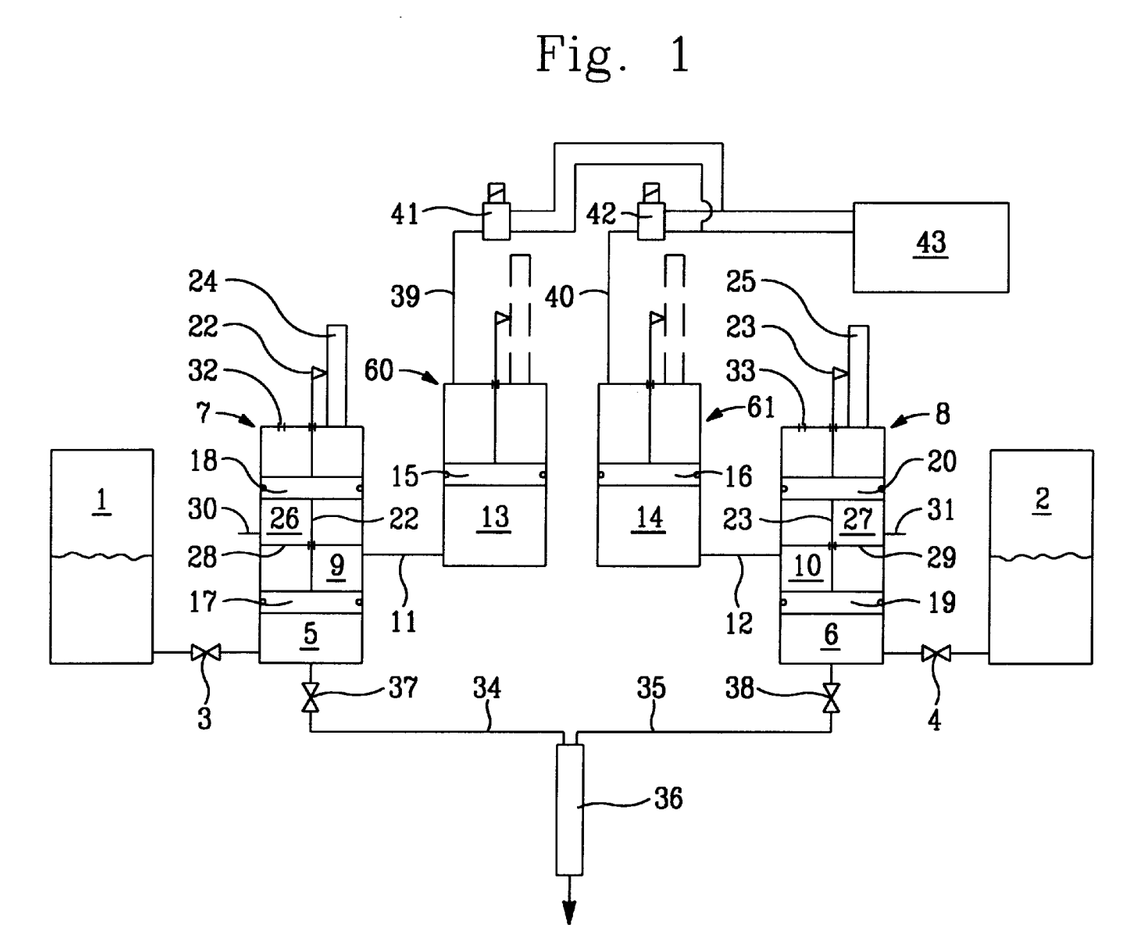
FIG. 1 is a schematic of apparatus for feeding casting resin.

The metering apparatus of FIG. 1 comprises two supply vessels 1, 2 for the components of the casting substance or the casting resin. The supply vessels 1, 2 may be kept under vacuum, though this is not mandatory per se. The particular component passes from the supply vessels 1, 2 through feed lines preferably fitted with shutoff valves 3 and 4 respectively into the product chamber 5, 6 of the piston-cylinder units 7, 8. The piston-cylinder units 7, 8 furthermore comprise a chamber 9 and 10 respectively for the drive fluid, said chambers 9, 10 being connected by connecting lines 11, 12 each with a drive piston space 13, 14 of a drive piston/cylinder unit 60, 61. The piston-cylinder units 7, 8 each comprise a conveyor piston 17, 19 and, spaced from them, suction or retraction pistons 18, 20 mounted on a piston rod 22, 23. Incremental detectors 24, 25 to ascertain the stroke paths of the piston-cylinder units 7, 8 are mounted on an extension of the piston rod 22, 23. A pressurized medium, for instance compressed air, may be introduced through a connector 30, 31 into the retraction chambers 26, 27 separated by a partition 28, 29 from the drive fluid chamber 9, 10 to implement the retraction of the pistons 19, 20 and 17, 18. In addition a vent 32, 33 is mounted on the back side of the retraction pistons 18, 20 at the cylinders.

The component lines 34, 35 issuing from the product chamber 5, 6 lead to a mixing system 36 and can be shut off by valves 37, 38.

The apparatus of the invention operates as follows:

By introducing a retraction medium through the connectors 30, 31 the pistons 17, 18 and 19, 20 are moved back, the valves 3, 4 being open and the valves 37, 38 being closed. As a result the components flow from the supply vessels 1, 2 into the corresponding product chambers 5, 6. When the pistons 17, 18 and 19, 20 are retracted, the operational fluid is displaced from the drive chamber 9, 10 by said fluid flowing through the connecting lines 11, 12 into the cylinder space 13, 14 of the drive piston/cylinder units 60, 61, the fluid present on the back side of the drive pistons 15, 16 passing through the feed lines 39, 40 and valves 41, 42 into the drive unit 43 for the drive fluid.

In the next step the valves 3, 4 are closed and the valves 37, 38 to the mixing system 36 are opened. In the process the drive pistons 15, 16 are loaded with pressurized fluid from the unit 43, whereby the drive liquid in the piston space 13, 14 arrives in the drive chamber 9, 10 of the piston-cylinder units 7, 8 of which the piston configuration 18, 17 or 20, 19 carry out a stroke so that the components arrive at the mixing system 36 synchronously and in the desired volume ratio and are mixed therein.

An (omitted) control unit is provided to synchronize the strokes and, depending on the incremental detectors 24, 25 to control the desired stroke conditions synchronously by means of the valves 41, 42. The above described apparatus allows freely preselecting the particular volume ratios and conveyance rates of the components and makes it possible, within the corresponding viscosity range of the components and correspondingly matched rated width of the feed lines and/or valves, to feed the components without resort to additional pumps. The apparatus is universally applicable for different casting volumes. The drive-piston/cylinder units 60, 61 and the product piston-cylinder units 7, 8 are stand-along units and thereby it is possible to use different drive groups 60, 61 for identical basic units 7, 8. Therefore a modular construction system is achieved overall. It makes it possible to design the apparatus in simple manner for the particular conditions.

Figure 2:
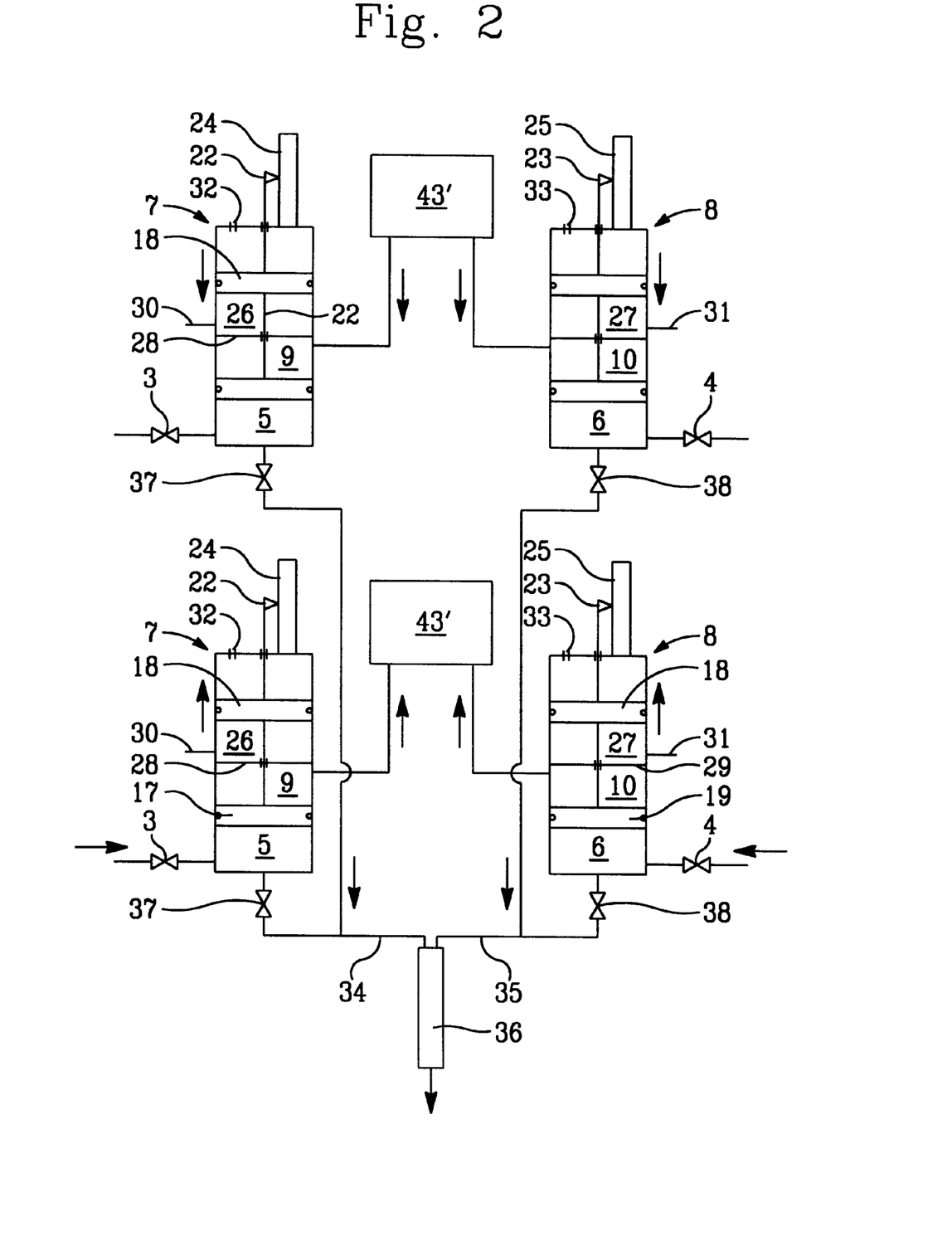
FIG. 2 is another embodiment of apparatus of the invention.
Figure 3:
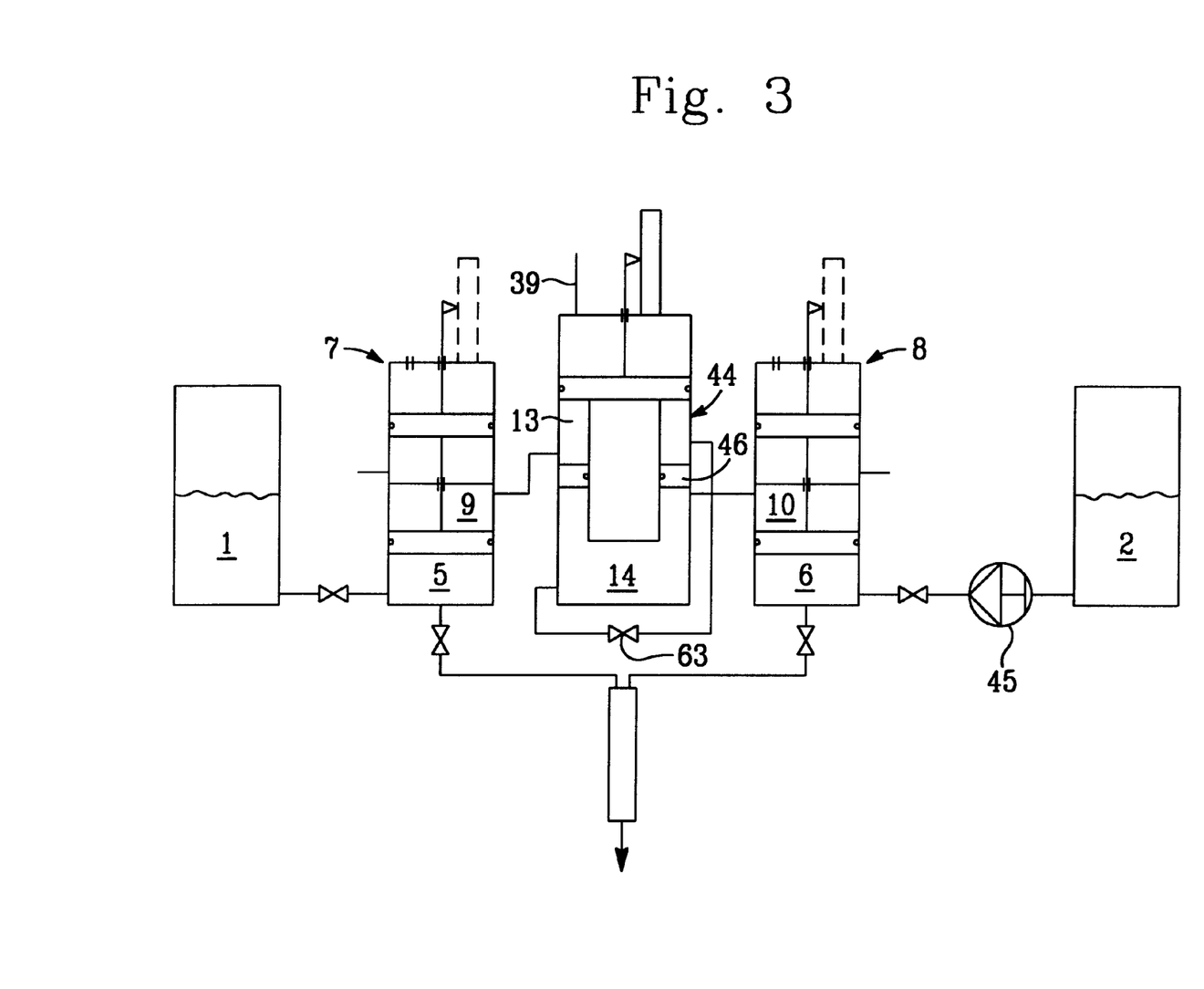
FIG. 3 is yet another embodiment of apparatus of the invention.

The apparatus of FIG. 1 can operate in strokes in order to make the mixed material available stroke-wise to the particular casting mold. Conceivably however the casting mold may be fed continuously in that the construction assembly of FIG. 1 is equipped with a second assembly operating in counter-stroke and feeding the particular components also to the mixing system 36 as shown in FIG. 2. In this manner continuous filling is possible without the casting jet being interrupted. In the embodiment of FIG. 2, the individual components corresponding to those of FIG. 1 are denoted by the same references. The drive units in the apparatus of FIG. 3 are denoted by the references 43' to indicate that variations of the drive of the embodiments shown in FIGS. 1, 3 and 4 may be used. Whereas the assemblies with piston-cylinder units and drive unit are doubled, preferably, on account of simpler design, the two supply vessels for the components will each be single.

The advantage of the described apparatus in modular form while exchanging the drive piston/cylinder units also is shown in FIG. 3. The apparatus of FIG. 3 differs from that shown in FIG. 1 in that a stepped piston-cylinder unit 44 is used with the drive unit and that its cylinder spaces 13, 14 are connected to the drive chambers 9, 10 of the piston-cylinder units 7, 8. Thereby the metering ratio is unambiguously determined and synchronization of the two piston-cylinder units 7, 8 ensues. FIG. 3 further shows the possibility to move a component from a supply vessel 1, 2 by means of a charging pump 45 into the product chamber, in the present case the product chamber 6 of the piston-cylinder unit 8. Insertion of an additional charging pump will be considered in particular for corresponding viscosities of a single component. Obviously each piston-cylinder unit also may be associated with a charging pump.

In the stepped piston-cylinder unit 44 the two cylinder spaces 13, 14 are separated from one another by a partition 46 having seals, advantageously the seal making contact with a non-abrasive or mutually inert material.

The design of the drive unit of FIG. 3 will be selected in particular when the mixing ratio of the components is fixed or will not be changed over a substantial time interval. It is further possible in such an embodiment to change the stepped piston to change the mixing ratio. This described apparatus is more economical with respect to control technology than that of FIG. 1.

A balancing valve system 63 is present between the cylinder spaces 13, 14 in order to scan the filling levels of the individual piston-cylinder units 7, 8 before the onset of conveyance and to be able to balance the quantities of loading fluid of the drive system.

Figure 4:
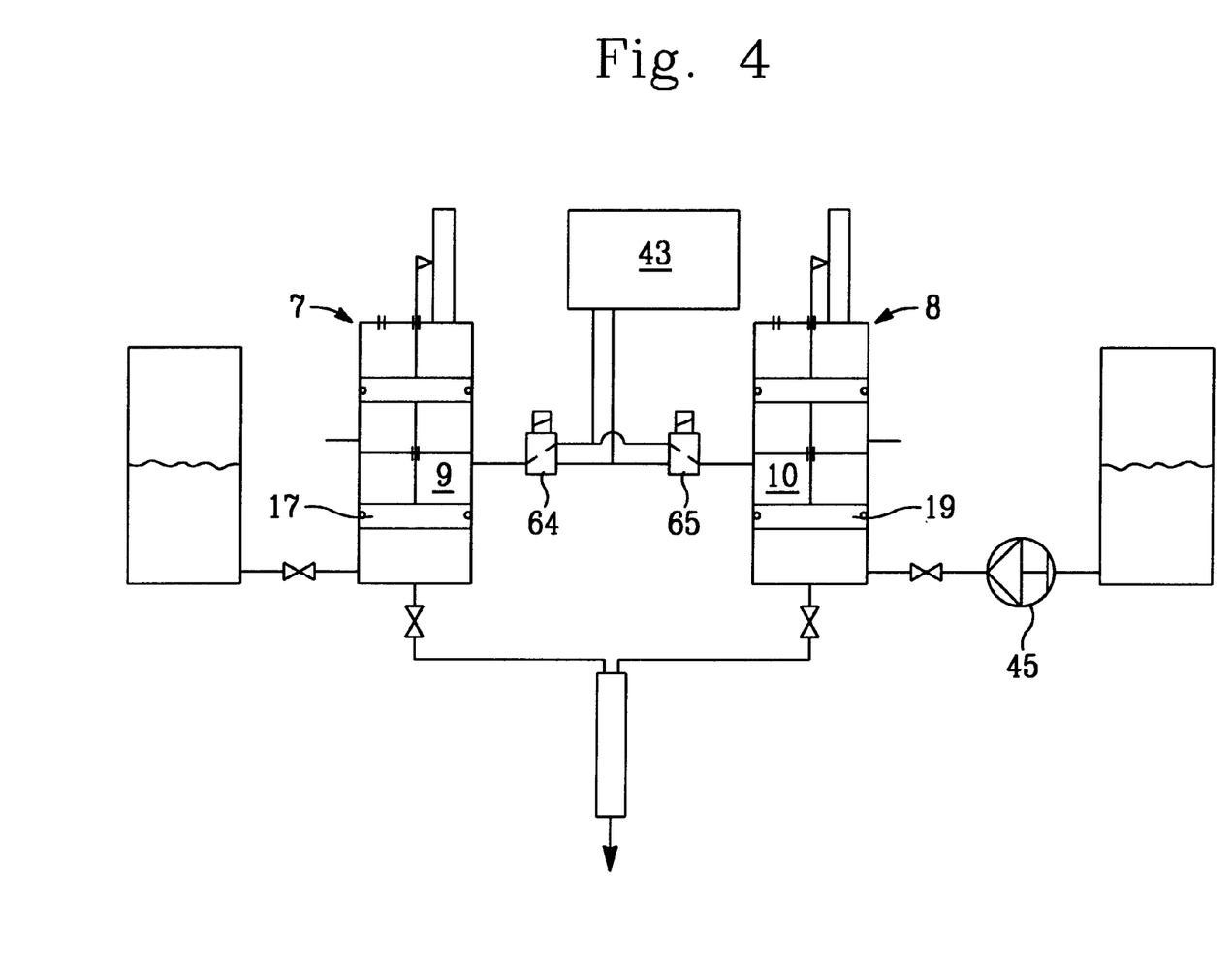
FIG. 4 is a fourth embodiment of apparatus of the invention.

FIG. 4 shows another embodiment variation of the basic system of FIGS. 1 through 3. In this case the drive unit 43 is designed as a pressurized medium assembly with direct connection to the drive chambers 9, 10 of the piston-cylinder units 7, 8. Again the feature of the freely adjustable metering or mixing ratio of the component is shared with the embodiment variation of FIG. 1. However care must be taken in this variation that the pressurized medium fed from the pressurized medium assembly 43 is chemically compatible with the particular component. The feed lines of the pressurized fluid or the control and regulating valves 64, 65 are used to implement the synchronized motion of the piston-cylinder unit 7, 8.

Figure 5:
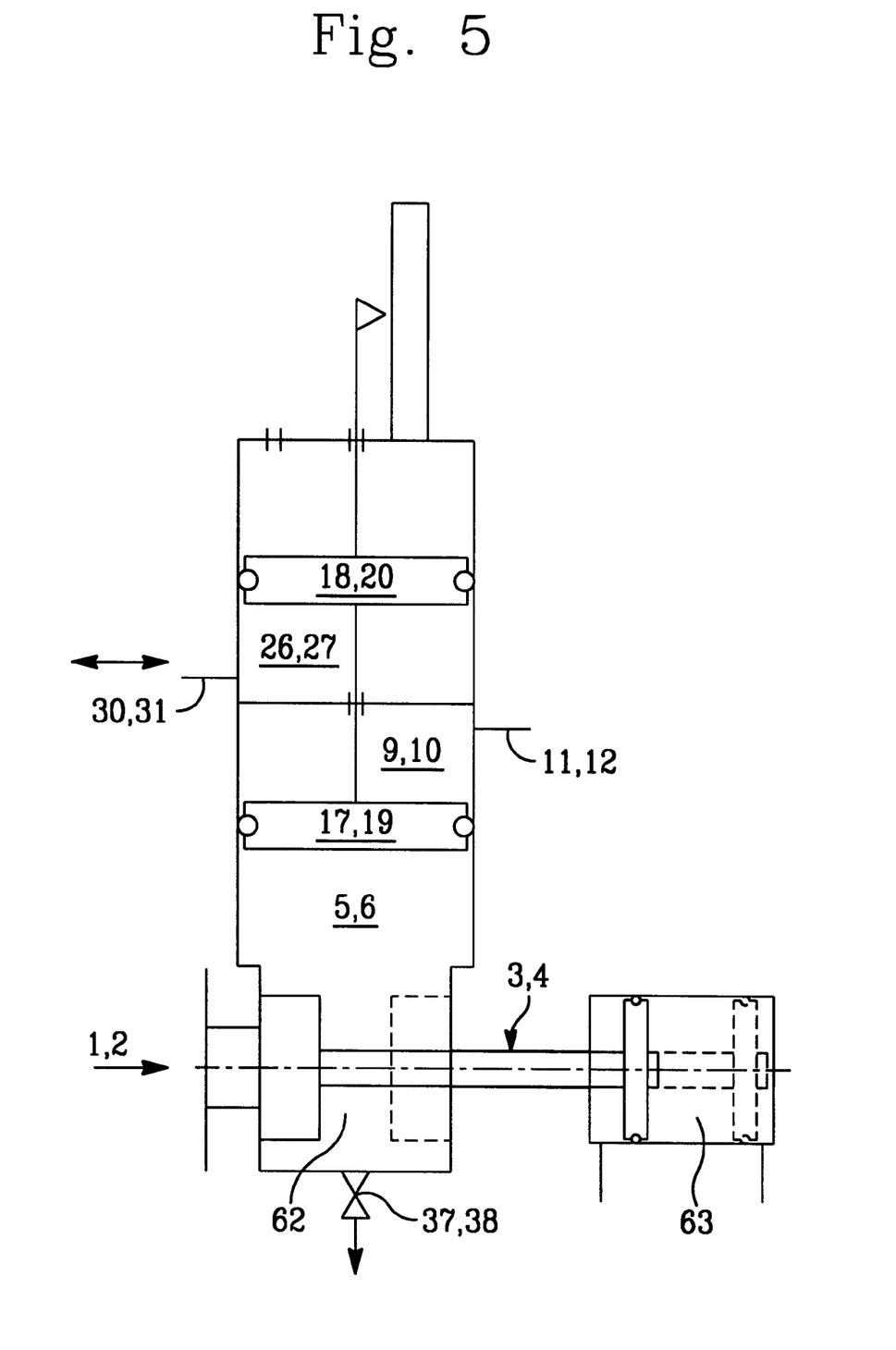
FIG. 5 represents a piston-cylinder unit to convey a component as shown in FIGS. 1 through 4, however with an additional shutoff member in the cylinder base.

FIG. 5 shows a piston-cylinder unit for conveying one component of the casting resin wherein the blocking member 3, 4 controlling the component intake is integrated into the housing base 62 adjoining the conveyance chamber 5 or 6. This design feature allows reducing the number of feed paths from the supply vessel 1, 2 to the piston-cylinder units 7, 8 to a minimum. In the selected illustrative embodiment, the blocking member 3, 4 can be driven by a pneumatic or hydraulic cylinder.

Figure 6:
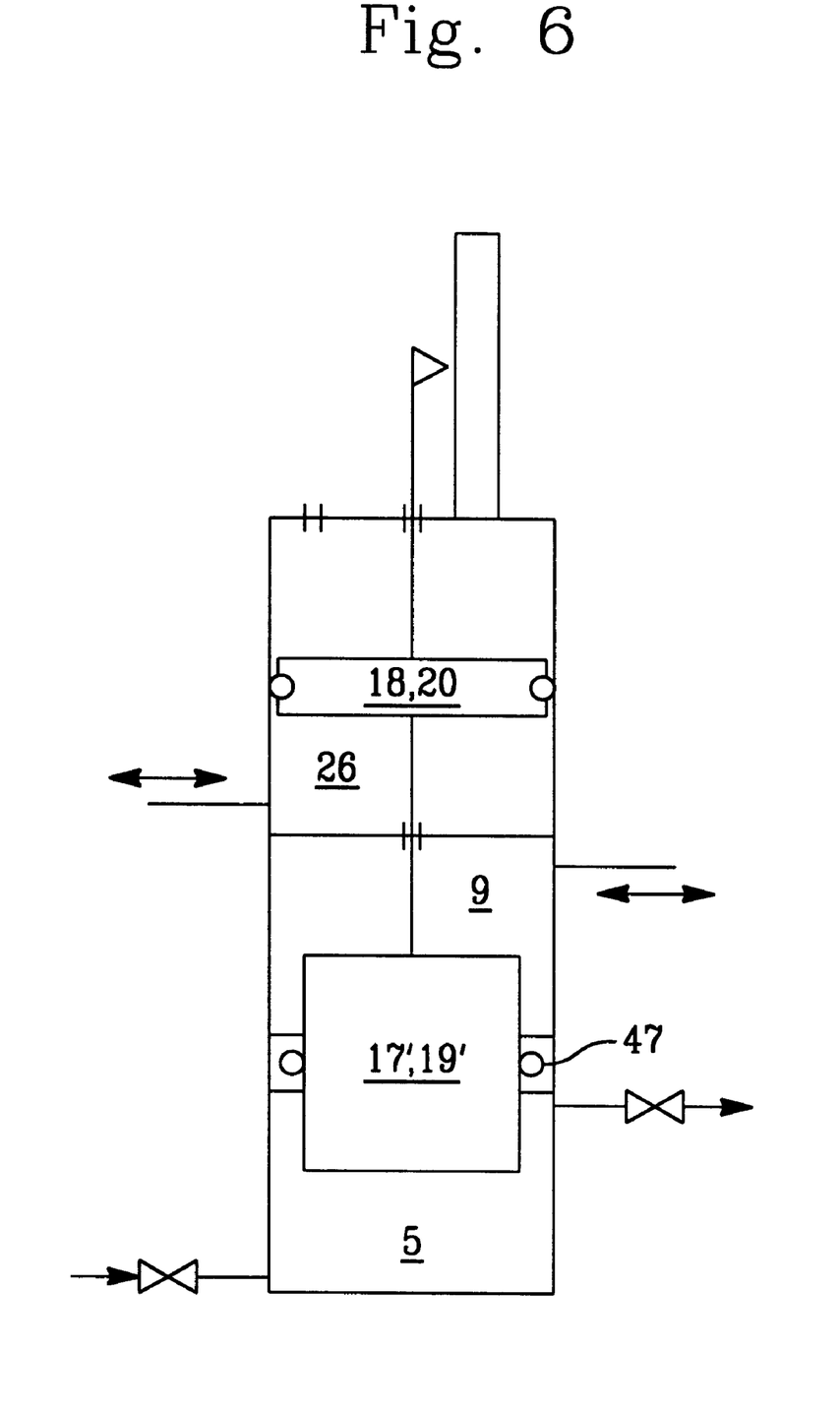
FIG. 6 shows a piston-cylinder unit with a plunger to convey a component.

In lieu of the piston-cylinder units 7, 8 shown in FIGS. 1 through 4, obviously a piston-cylinder unit with a plunger shown in FIG. 6 also may be used. In similarity to the illustrative embodiment of FIG. 1, the product chamber is denoted by 5, the drive chamber by 9 and the piston retraction chamber by 26, whereas the conveyance piston is denoted by 17' and 19' respectively. Again the retraction piston is denoted by the references 18, 20. A seal 47 fixed in the cylinder space separates the product chamber 5 from the drive chamber 9.

Obviously the material of the piston-cylinder units also is arbitrary, for instance ceramics, especially oxide ceramics may be used.

It is further understood that instead of fluid drives, mechanical drives, for instance threaded spindle drives, may be used to displace the drive pistons 15, 16 or 44.

Again it is possible in the same manner to use the apparatus of the invention not only for two, but for a larger number of casting-material components, in which case the number of supply vessels, feed lines, piston-cylinder units and drive units for instance in the form of a triple-stepped piston will be commensurately more numerous. Also the apparatus may operate reproducibly in programmed sequences. Further, the apparatus of FIGS. 1 through 4 may be simultaneously used as pressure-keeping devices in pressurized gelling to maintain the follow-up pressure. Obviously too the apparatus of the invention is suitable not only for the pressurized gelling procedure, but also for all further casting applications.

Where incremental detectors are needed, it is obviously possible to mount them to the product-side piston-cylinder units 7, 8 and/or to the drive-side piston-cylinder units 60, 61 or 44. Preferably they shall be mounted to the product-side piston-cylinder units 7, 8 because higher accuracy is provided to that extent.

A further advantage of the apparatus of the invention is that compared to feed pumps it makes possible operating at substantially higher pressures, whereby larger distances at correspondingly small feed-line cross-sections to the casting molds may be overcome with the individual components and with the casting substance.

Figure 7:
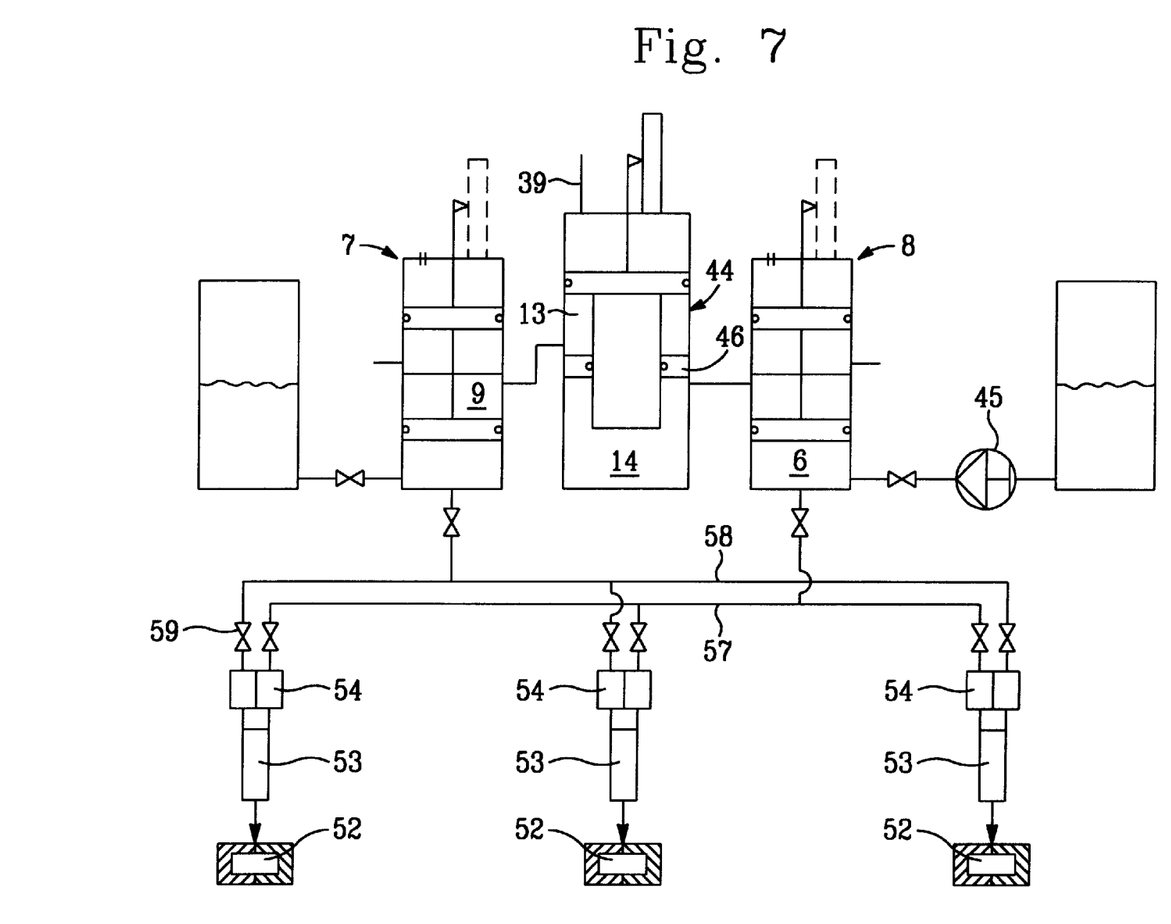
FIG. 7 shows apparatus of the invention similar to FIG. 3 but for multiple casting.
Figure 8:
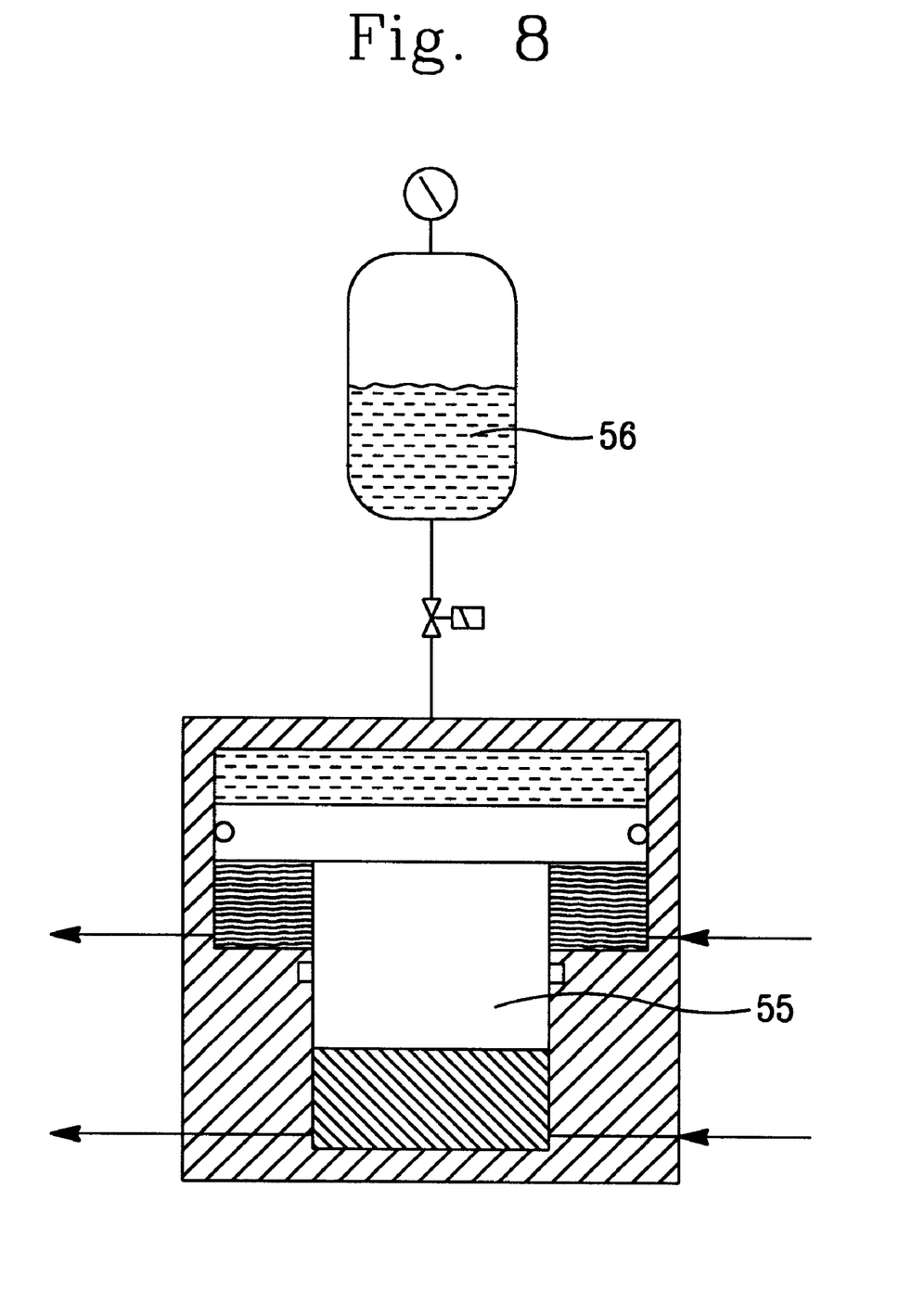
FIG. 8 shows a buffer element for a pressurized gelling apparatus of FIG. 7.

FIG. 7 shows a variation of the above described systems and in particular of that shown in FIG. 3. To make possible better utilization of the metering assembly, an in-line mixer 53 with buffer 54 is associated to each casting mold 52. As a result several casting molds 52 can be filled in time-staggered manner and be kept under follow-up pressure by the particular buffer 54 during the gelling phase. FIG. 8 illustratively shows a possible embodiment mode of a buffer mounted ahead of the in-line mixers 53 wherein the components are fed-in separately from one another and are moved on at the desired recipe ratio. The design of the buffer 54 may be similar to that of the piston-cylinder unit 44 of FIG. 3, comprising a stepped piston 55 and an operating fluid received in a pressurized container 56.

The individual components are fed to the buffer 54 through feed lines 57, 58, shutoff valves 59 being inserted each time in the connecting lines to the buffers 54 in order to decouple the buffers 54 with associated in-line mixer 53 and casting mold 52 from the remaining system during the gelling phase. This feature makes possible versatile utilization of the metering system.

I claim:

1. Apparatus for feeding fluid substances composed of at least two mutually reacting components, said apparatus comprising:
    a plurality of supply vessels each containing one component of said mutually reacting components,
    a plurality of piston-cylinder units each having a conveyor piston, the components being moved from said plurality of said supply vessels to said piston-cylinder units, the piston-cylinder units being fitted with retraction means for retracting the conveyor pistons (17, 19),
    a mixing system (36) for receiving each of said mutually reacting components, and
    a drive system to drive the conveyor pistons with pressurized fluid,
    wherein the piston-cylinder units define a displacement volume having a lower limit that is determined by the viscosity of the component to be conveyed and by a stroke frequency of the conveyor pistons in relation to a required conveyance rate.

2. The apparatus as claimed in claim 1, wherein the displacement volume of the piston-cylinder units in each case is between 0.1 and 4 liters.

3. The apparatus as claimed in claim 1, wherein a conveyance-side and a drive-side effective piston surface of the conveyor pistons of the piston-cylinder units are approximately equal.

4. The apparatus as claimed in claim 1, wherein at least one system is provided to detect the position of at least one of the conveyor pistons.

5. The apparatus as claimed in claim 1, further comprising a shutoff member for component intake or discharge from a conveyor chamber of at least one of said piston cylinders integrated preferably into a housing base adjoining the conveyor chamber.

6. The apparatus as claimed in claim 1, wherein the conveyor piston of the piston-cylinder unit and a retraction piston of the associated retraction means are held mutually spaced on a piston rod and wherein a partition is mounted between the conveyor piston and the retraction piston and separates a drive chamber facing the conveyor piston for the drive fluid from a chamber facing the retraction piston to provide fluid loading for the retraction of the conveyor piston.

7. The apparatus as claimed in claim 1, wherein one drive-piston-cylinder unit is associated to each piston-cylinder unit, a cylinder space of said unit being connected to the drive chamber of the associated piston-cylinder unit.

8. The apparatus as claimed in claim 1, wherein the drive system comprises a drive-piston-cylinder unit having a stepped piston of which the individual cylinder spaces are each associated to a drive chamber of a piston-cylinder unit.

9. The apparatus as claimed in claim 8, wherein a balancing valve system is provided between the cylinder spaces of the drive-piston-cylinder unit.

10. The apparatus as claimed in claim 1, wherein the drive system is designed for directly loading the conveyor pistons with pressurized fluid through control and regulation valves.

11. The apparatus as claimed in claim 1, wherein the drive system is designed to maintain a corresponding follow-up pressure on the at least one casting mold by way of the drive fluid and by way of the conveyor pistons of the piston-cylinder units.

12. The apparatus as claimed in claim 1, wherein the conveyor piston of a particular piston-cylinder unit is designed as a plunger, the separation between a product chamber receiving the particular component and a drive chamber for drive-fluid loading is implemented by a fixed seal.

13. The apparatus as claimed in claim 1, wherein a charging pump is provided to feed a particular component from the supply vessel to the piston-cylinder unit.

14. The apparatus as claimed in claim 1, wherein said apparatus is designed to fill at least two casting molds with casting resin and in that a mixing system is associated with each casting mold, each mixing system being connected by blockable feed lines with the piston-cylinder units.

15. The apparatus as claimed in claim 14, wherein at least one buffer is associated to the casting molds, said buffer being designed to maintain a follow-up pressure on a particular casting mold.

16. The apparatus as claimed in claim 15, wherein the buffer precedes the particular mixing system each time with one buffer element for one component.

17. The apparatus as claimed in claim 15, wherein the buffer is designed as a piston-cylinder unit having a stepped piston for the at least two components.

18. The apparatus as claimed in claim 1, wherein the piston-cylinder units are designed dually as a construction unit relative to the mixing system, two construction units conveying the particular components in counter-strokes to the mixing system.

19. The apparatus as claimed in claim 2, wherein the displacement volume of the piston-cylinder units in each case is about 1 liter.

20. The apparatus as claimed in claim 1, further comprising a shutoff member for component intake to and discharge from the conveyor chamber integrated preferably into the housing base adjoining the conveyor chamber of the particular piston-cylinder unit.

21. The apparatus as claimed in claim 1, wherein the drive system is designed for directly loading the conveyor pistons with pressurized fluid through control or regulation valves.

* * * * *